United States Patent [19]
Prasad

[11] Patent Number: 5,709,732
[45] Date of Patent: Jan. 20, 1998

[54] ADVANCED MEMBRANE SYSTEM FOR SEPARATING GASEOUS MIXTURES

[75] Inventor: Ravi Prasad, East Amherst, N.Y.

[73] Assignee: Praxair Technology, Inc., Danbury, Conn.

[21] Appl. No.: 626,559

[22] Filed: Apr. 2, 1996

[51] Int. Cl.$^6$ .................................................. B01D 53/22
[52] U.S. Cl. ............................................ 95/45; 95/54; 96/9
[58] Field of Search .................................. 95/45, 47–55; 96/4, 7–9

[56] References Cited

U.S. PATENT DOCUMENTS

| | | | |
|---|---|---|---|
| 3,208,197 | 9/1965 | Simon et al. | 95/45 |
| 3,250,080 | 5/1966 | Garwin | 95/53 X |
| 3,274,750 | 9/1966 | Robb | 95/45 |
| 3,307,330 | 3/1967 | Niedzielski et al. | 95/45 |
| 4,119,417 | 10/1978 | Heki et al. | 55/158 |
| 4,130,403 | 12/1978 | Cooley et al. | 55/16 |
| 4,180,388 | 12/1979 | Graham et al. | 55/16 |
| 4,264,338 | 4/1981 | Null | 55/16 |
| 4,424,067 | 1/1984 | Tarasenko et al. | 95/48 |
| 4,560,394 | 12/1985 | McDonald et al. | 95/54 |
| 4,931,070 | 6/1990 | Prasad | 95/52 |
| 4,994,094 | 2/1991 | Behling et al. | 95/50 X |
| 5,069,686 | 12/1991 | Baker et al. | 95/47 |
| 5,071,451 | 12/1991 | Wijmans | 95/47 |
| 5,102,432 | 4/1992 | Prasad | 95/54 |
| 5,169,412 | 12/1992 | Prasad et al. | 95/47 |
| 5,185,014 | 2/1993 | Prasad | 95/54 |
| 5,226,932 | 7/1993 | Prasad | 95/45 |
| 5,281,253 | 1/1994 | Thompson | 95/45 X |
| 5,282,969 | 2/1994 | Xu | 95/45 X |
| 5,314,528 | 5/1994 | Monereau | 95/55 |
| 5,378,263 | 1/1995 | Prasad | 95/45 X |
| 5,383,956 | 1/1995 | Prasad et al. | 95/45 |
| 5,415,681 | 5/1995 | Baker | 95/45 |
| 5,482,539 | 1/1996 | Callahan | 95/45 X |

FOREIGN PATENT DOCUMENTS

| | | | |
|---|---|---|---|
| 0695574 | of 0000 | European Pat. Off. | |
| 0596268 | 5/1994 | European Pat. Off. | 95/47 |

OTHER PUBLICATIONS

Sol Weller and Waldo A. Steiner, "Fractional Permeation Through Membranes", *Chemical Engineering Progress*, v vol. 46, No. 11, Nov. 1950.

M. Ohno et al., "Separation of Rare Gases By Membranes", *Radiochem, Radional*, Letter 27(5–6) 299–306 (1976).

Ohno et al., "Comparison of Gas Membrane Separation Cascades Using Conventional Separation Cell and Two–Unit Separation Cells", *Journal of Nuclear Science and Technology*, 15(5)m pp. 376–386 (May 1978).

S.A. Stern, "Recycle and Multimembrane Permeators For Gas Separations", *Journal of Membrane Science*, 20 (1984) 25–43.

Ward et al., "Membrane Oxygen Enrichment", *General Electric Company*, Mar. 1985.

F.P. McCandless, "A Comparison of Some Recycle Permeators For Gas Separations", *Journal of Membrane Science*, 24 (1985) 15–28.

Yuen–Koh Kao, "A Parametric Study Of Recycle Membrane Separators", *Journal of Membrane Science*, 39 (1988) 143–156.

Zhiquan Yan et al., "Comparative Study Of Two–Membrane Permeators For Gas Separators", *Journal Of Membrane Science*, 42 (1989) 147–168.

Yuen–Koh Kao et al., "Critical Evaluations of Two Membrane Gas Permeator Designs", *Ind. Eng. Chem. Res.* 1989, 28, 1514–1520.

C.Y. Pan et al., "Gas Separation by Permeation. Part I, Calculation Methods and Parametric Analysis", *The Canadian Journal of Chemical Engineering*, vol. 56, Apr. '78.

*Primary Examiner*—Robert Spitzer
*Attorney, Agent, or Firm*—Robert J. Follett

[57] ABSTRACT

Membrane separation methods and systems separate gaseous mixtures into purified component gases thereof. Purified oxygen gas (60–90% purity), for example, may be derived from ambient air in an efficient manner. Systems and methods are provided by which at least three permeator stages are used while requiring less than one compressor per stage. Energy requirements are reduced and product purity as a function of energy requirements is improved.

21 Claims, 4 Drawing Sheets

ADVANCED MEMBRANE SYSTEM FOR SEPARATING GASEOUS MIXTURES

BACKGROUND OF THE INVENTION

The present invention relates to methods and membrane separation systems that separate gaseous mixtures into more purified component gases thereof (e.g., systems that can produce purified oxygen gas (60–90% purity) from ambient air) in an efficient manner.

The availability of hollow-fiber membranes and membrane modules has made possible the development of simple processes for the production of oxygen and nitrogen from ambient air. In the prior art, air is compressed and flows along the fiber bundle. Oxygen is preferentially permeated and the low-pressure permeate is rich in oxygen. The flowing retentate stream becomes progressively richer in nitrogen as the oxygen continues to permeate the membrane.

In a prior art single-stage process, using membranes more permeable to oxygen than nitrogen, if enriched nitrogen is the desired product and the purity is insufficient, it is only necessary to expose the nitrogen-enriched retentate stream to more membrane surface to remove additional oxygen impurity. Because the nitrogen-containing retentate stream remains at high pressure, no additional compression is required. The oxygen-rich permeate stream, however, is at low pressure. If additional treatment is needed to further purify oxygen, the oxygen-enriched permeate stream must be recompressed before it can be further purified by membrane permeation. The required recompression demands additional energy.

The permeate product purity obtainable in a simple single stage process is limited by the inherent separation factor of the membrane. Since presently available membranes generally have separation factors of less than 10, it is readily apparent that a single-stage membrane cannot be used to produce high-purity oxygen. Multiple stage processes are therefore required.

The production of oxygen from air has been a goal of membrane process modeling for at least 40 years. Weller and Steiner, "Engineering Aspects of Separation of Gases", Chem. Eng. Progress, 46(11), pp 585–590, describe a single stage process for the enrichment of oxygen in air but noted the limitation in terms of the product purity which results. To circumvent this problem, they proposed a multi-stage cascade process which is capable, at least theoretically, of producing 91% O2. In the cascade process, the feed of stage n is composed of the retentate of stage n+1 and the permeate of stage n−1. Each permeate stream needs a compressor to boost the pressure to that of the retentate. This tends to create a significant disadvantage as the number of stages becomes larger. However, it is possible to produce oxygen of a desired purity by using an adequate number of stages.

Walawender and Stern, "Analysis of Membrane Separation Parameters II. Countercurrent and Concurrent Flow in a Single Permeation Stage", Separation Science, 7(5), pp 553–584, extended the analysis of the single stage process for various permeation models, membrane characteristics, and operating conditions.

The prior art also teaches the use of a two-stage recycle process, where the permeate of the second stage is recycled to the feed of the first stage. The oxygen concentration can be controlled by adjusting the overall stage cut (the ratio of the flow rate of the permeate to the feed flow rate), the area distribution among the stages and the pressure ratio (feed pressure/permeate pressure) of operation. For a membrane with a selectivity of 6, this type of process is capable of producing oxygen purities greater than 50% when the recycle rate of $O_2$ enriched permeate from the second stage is large enough. With a high recycle rate and a sufficiently low stage cut, the recycled stream is rich in oxygen relative to air thus raising the oxygen concentration in the feed to the first permeator stage. This process only requires a single compressor, but the amount of gas compressed increases with the amount of gas that is recycled.

Ohno, et al, "Separation of Rare Gases by Membranes", Radiochem. Radioanal. Letters 27(5–6), pp 299–306, describes a process with two stages in series in which the permeate of the second stage is recycled to the feed of the first. This process was applied to N2-Kr and He-Kr separations. This process needs only a feed compressor.

Ohno et al., "Comparison of Gas Membrane Separation Cascades using Conventional Separation Cell and Two Unit Separation Cells", J. Nuc. Sci. Tech., 15(5), pp 376–386, analyzed the two stages in series process and found it economically attractive versus a conventional two stage unit. Pan et al. "Gas Separation by Permeation Part 1. Calculation Methods and Parametric Analysis", Can. J. Chem. Eng., 56, pp 197–209, specifically applied the two stage recycle process to the production of oxygen from air.

The continuous membrane column described by Hwang et al., "Gas Separation by a continuous Membrane Column", Separation Science and Tech., 15(4), pp 1069–1090, shows O2-N2 separation as one of the first examples. In this process, the separation apparatus is divided into stripping and enriching sections each having a countercurrent reflux. Compared to a conventional single stage process, the column is claimed to be able to produce significantly higher O2 purity with a lower compressor factor but perhaps higher area requirement. However, analysis performed by Stern et al. "Recycle and Multimembrane Permeators for Gas Separations", J. Membrane Sci., 20, pp 25–43, has shown that such a continuous membrane column is inferior to the two stage recycle process.

Stern analyzed the problem of O2 production comparing various one and two stage recycle processes, the continuous membrane column and a new multi-membrane permeator. Of particular interest to the author was the impact of permeate or retentate recycle on product purity.

Ward et al. "Membrane Oxygen Enrichment", General Electric Co., compared the use of single and two stage recycle membrane processes as well as the continuous membrane column to conventional cryogenic and PSA sources of oxygen. In this paper, the niche for membrane processes is described as low volume, low purity (<50% O2) applications. For a production of 90% purity O2, a revolution in membrane technology was described as being necessary.

Other researchers have revisited the application of recycle membrane permeators to the separation of O2 from air or other gas streams. Kimura et al, "Membrane Oxygen Enrichment I. Demonstration of Membrane Oxygen Enrichment for Natural Gas Combustion", J. Mem. Science, 29, pp 69–77, describes an actual demonstration of a single stage unit for the modest enrichment of air (about 30% O2) for combustion purposes. In this particular process, the permeate was vacuum pumped rather than feed compressed. This is a good illustration of the low purities typically obtained in single stage processes.

Qiu et al., "Economic Evaluation Gas Membrane Separator Designs", Ind. Eng. Chem. Res., 28, pp 1670–1677, performed an economic evaluation of the continuous membrane column, and both the one and two stage recycle processes for the production of 55% O2 from air. In this evaluation, the continuous membrane column was found to be most economical.

U.S. Pat. No. 4,180,388 discloses a process for separating one gas from a mixture of gases using a two stage permeation system. U.S. Pat. No. 4,130,403 discloses a method of using membranes for removing acid components from a mixture containing primarily natural gas. It involves two stage membranes, arranged in series, wherein the permeate from the second stage is compressed and recycled to the second stage inlet after undergoing another membrane separation.

U.S. Pat. No. 4,119,417 discloses a membrane gas mixture separator system which employs two membrane cells operating in series, wherein the permeate from the second stage is recycled to a point upstream of the previous feed compressor. U.S. Pat. No. 4,264,338 discloses a method of separating gases by means of membranes selective for the permeation of one of the gases of a gas mixture. It involves plural stages of membrane separation wherein a gas mixture from the second stage is directed to a recycle stage membrane separation to provide a permeate enriched in the desired gas and blending the permeate with the feed of the second stage.

Another prior art method for increasing oxygen purity is a 2-stage feed-refluxed process. This feed refluxed process depends on the availability of 4-port membrane modules that can accommodate two streams, the high pressure and low-pressure streams, in countercurrent flow separated by the membrane. In this process, the ambient air flows first as a low-pressure purge through the second membrane stage. This stream becomes enriched in oxygen, relative to air, by the oxygen permeation in the second stage. This oxygen-enriched air is then compressed to serve as the high-pressure feed to the first permeation stage. The first-stage permeate is further enriched in oxygen and is the product. With a selectivity of 6, oxygen concentrations of 50–60% can be efficiently produced this way, in a process that uses a single compressor. This process avoids the mixing losses that are inherent in the normal two-stage recycle process.

Another way to increase the oxygen purity is by use of a "cascade" process, such as shown in FIG. 1. Here the oxygen-enriched permeate from the first stage is recompressed to serve as the feed for the second stage. The permeate of the second stage, having been further enriched in oxygen, is the product. If the stage-cut is not too high, the second stage retentate will be rich in oxygen, relative to air. This stream can then be beneficially recycled to the feed of the first stage. This not only increases the oxygen concentration of the first stage feed, but also decreases the required flow from the first-stage compressor, thus reducing the energy requirement.

Two-stage and three-stage cascade processes require a separate compressor for each stage, whereas the present invention's three stage process requires only two compressors and is, therefore, simpler and more efficient than a three stage cascade process.

The prior art is deficient in that the feed refluxed process is efficient, but cannot produce a truly high-purity product with current membrane properties. A cascade process can be extended to utilize three or more stages, but each additional stage requires an additional compressor and thus additional energy requirements.

Prior art multi-stage recycle systems of any of the foregoing configurations are believed to suffer inefficiencies resulting from the content of the recycled stream differing from the content of the stream into which it is recycled. The stream of highest purity is diluted, thus significantly reducing overall efficiency by lowering purity at certain locations while it is the overall purpose of the system to raise purity. As explained herein, in accordance with the present invention, alterations in various parameters may be used to cause recycled streams to be of similar purity to upstream gaseous mixtures with which they are mixed. Even the prior art apparatus may be adjusted in this manner to perform the method of the invention. However, a preferred new apparatus is also disclosed herein.

SUMMARY OF THE INVENTION

The present invention provides systems and methods for producing high purity component gases of a gaseous mixture efficiently and without necessarily requiring a compressor for each permeator stage.

One object of the invention is to substantially avoid mixing-related dilution by matching, as closely as possible, the purity of any recycled stream to the purity of any upstream gaseous mixture into which the recycled stream is intermixed.

In one embodiment, the invention provides a method for separating a gaseous mixture into a purified component gas thereof comprising introducing a feed mixture of gases to be purified into a separation apparatus containing a plurality of permeators each of which has a gas separation membrane that divides each permeator into a permeate side and a retentate side, wherein said feed mixture is introduced into an upstream permeator side and an effluent stream from said upstream permeator side feeds directly or indirectly into at least one downstream permeator side, and wherein an effluent of at least one downstream permeator side is recycled and intermixed with an upstream gaseous mixture; wherein a percentage of said component gas in said recycled effluent differs from a percentage of said component gas in said upstream gaseous mixture by no more than ten at a point where said recycled effluent and said upstream gaseous mixture intermix; said method further comprising recovering said purified component gas as effluent from a permeate side of a permeator that is downstream from at least one other permeator. Where more than one stream is recycled, the foregoing "no-more-than-ten-percent" requirement is satisfied if it is true for any one of the recycled streams.

As used herein, the terms "upstream" and "downstream" are determined by reference to the number of permeator sides (or parts thereof) through which a gas entering a separation apparatus from the outside must necessarily flow before reaching a given point in the apparatus. Thus, for example, a position in a separation system which can be reached only by first passing through two permeator sides is "downstream" of a different position that may be reached after passing through only one permeator side. Conversely, said different position is "upstream" of the first-mentioned position. Note that the foregoing definition is independent of how many permeator sides might theoretically be passed by a given gas molecule which, for example, might by happenstance be recycled several times. The definition instead depends upon the number of permeator sides through which gas must necessarily flow before reaching a given position. Because of countercurrent flow, in many embodiments of the invention, a permeator's permeate side may be upstream of a given position while the same permeator's retentate side may be downstream of that position. The term "upstream" may include, where appropriate, the original feed mixture that enters the apparatus.

As used herein, "influx" is a gaseous stream that enters a permeator side and "effluent" is a gaseous stream that exits a permeator side.

In another embodiment, the invention provides a method for separating a gaseous mixture into a purified component gas thereof comprising introducing a feed mixture of gases to be purified, into a separation apparatus containing:

(a) a first permeator containing a first gas separation membrane that divides said first permeator into a first permeate side and a first retentate side, (b) a second permeator containing a second gas separation membrane that divides said second permeator into a second permeate side and a second retentate side, (c) a third permeator containing a third gas separation membrane that divides said third permeator into a third permeate side and a third retentate side, (d) a first conduit connecting an effluent end of said second permeate side to an influx end of said first retentate side for conducting a gaseous stream from said second permeator to said first permeator, (e) a second conduit connecting an effluent end of said first retentate side to an influx end of said second retentate side for conducting a gaseous stream from said first permeator to said second permeator, (f) a third conduit connecting an effluent end of said first permeate side to an influx end of said third retentate side for conducting a gaseous stream from said first permeator to said third permeator, and (g) a fourth conduit connecting an effluent end of said third retentate side to said first conduit or an influx end of said first retentate side, for conducting a recyclable gaseous effluent from said third retentate side to said first conduit or said influx end of said first retentate side and for intermixing said recyclable effluent into a gaseous stream flowing through said first conduit or said influx end of said first retentate side;

(h) an inlet for receiving said feed mixture into a position selected from the group consisting of the first conduit, the second permeate side, and the first retentate side; and (i) a compressor upstream of said first retentate side;

wherein said method further comprises obtaining said purified component gas as permeate from said third permeator.

In another embodiment, the invention provides an apparatus for separating gaseous mixtures into a purified component gas thereof comprising:

(a) a first permeator containing a first gas separation membrane that divides said first permeator into a first permeate side and a first retentate side, (b) a second permeator containing a second gas separation membrane that divides said second permeator into a second permeate side and a second retentate side, (c) a third permeator containing a third gas separation membrane that divides said third permeator into a third permeate side and a third retentate side, (d) a first conduit connecting an effluent end of said second permeate side to an influx end of said first retentate side for conducting a gaseous stream from said second permeator to said first permeator, (e) a second conduit connecting an effluent end of said first retentate side to an influx end of said second retentate side for conducting a gaseous stream from said first permeator to said second permeator, (f) a third conduit connecting an effluent end of said first permeate side to an influx end of said third retentate side for conducting a gaseous stream from said first permeator to said third permeator, (g) a fourth conduit connecting an effluent end of said third retentate side to said first conduit or to said first retentate side, for conducting a recyclable gaseous stream from said third retentate side to said first conduit or to said first retentate side and for intermixing said recyclable stream into a gaseous stream flowing through said first conduit or through said first retentate side, (h) an inlet for receiving said original gaseous mixture into the apparatus at a position selected from the group consisting of the first conduit, the second permeate side, and the first retentate side, and (i) a compressor upstream of said first retentate side.

The conduits utilized in the systems of the present invention may include one or more sections, and may include compressors therein for compressing gases that are conveyed through said conduit such that as gases travel, for example from an upstream permeator through said conduit to a downstream permeator, pressurization occurs and the gases enter the downstream permeator at a higher pressure than they exited the upstream permeator.

One embodiment of this invention provides a system wherein all the permeators are three port permeators (see, e.g. FIG. 3).

Another embodiment provides a system wherein at least one of the permeators is a four port permeator (see, e.g. FIG. 2).

In the above-described apparatus, the location of an inlet for introducing the gaseous mixture to be purified is upstream of the first permeator (e.g., at positions including but not limited to the permeate side of the second permeator (see FIG. 2) or somewhere along the first conduit (see FIG. 3)).

In another embodiment, concentration of component gases in the fourth and first conduits is made substantially identical at the position where the first and fourth conduits intersect.

It is an object of the present invention to avoid purity losses at the point where gaseous streams intermix. In addition to the aforementioned mixing of the retentate stream of permeator three into conduit one, it is also desirable to maintain a flow rate of gaseous mixtures at a level that causes a percentage of said component gas in a gaseous mixture permeating at a distal end of said second separation membrane to differ from a percentage of said component gas in a countercurrent stream entering said second permeate side at said distal end by less than 10%. By "distal end" is meant the end that is both farthest downstream on the retentate side and farthest upstream on the permeate side. A difference of less than 5% is preferred and a difference of less than 2% is more preferred. The same preferences (less than 5% and especially less than 2%) also hold true for the mixture of gaseous streams where the fourth and first conduits join, (see point 19, FIG. 2) and at other locations where two streams intermix, except as otherwise stated herein. By a 2% difference, it is meant that, for example, a stream that is 48% oxygen would be mixed with another stream that is no more than 50% and no less than 46% oxygen.

In one preferred embodiment of the invention, the foregoing apparatus further comprises:

a first compressor within said first conduit capable of raising the pressure of gases entering said first retentate side relative to the pressure of gases exiting said second permeate side;

a second compressor within said third conduit capable of raising the pressure of gases entering said third retentate side relative to gases exiting said first permeate side;

a fifth conduit for conducting a gaseous stream from an effluent end of said second retentate side out of said apparatus, wherein said fifth conduit includes a flow control means.

The flow control means may be any of a variety of structures known in the art including but not limited to a valve, an orifice, a restrictor, regulator, or the like.

Other features and advantages of the present invention will become apparent from the following description of the invention which refers to the accompanying drawings.

Figure 1:
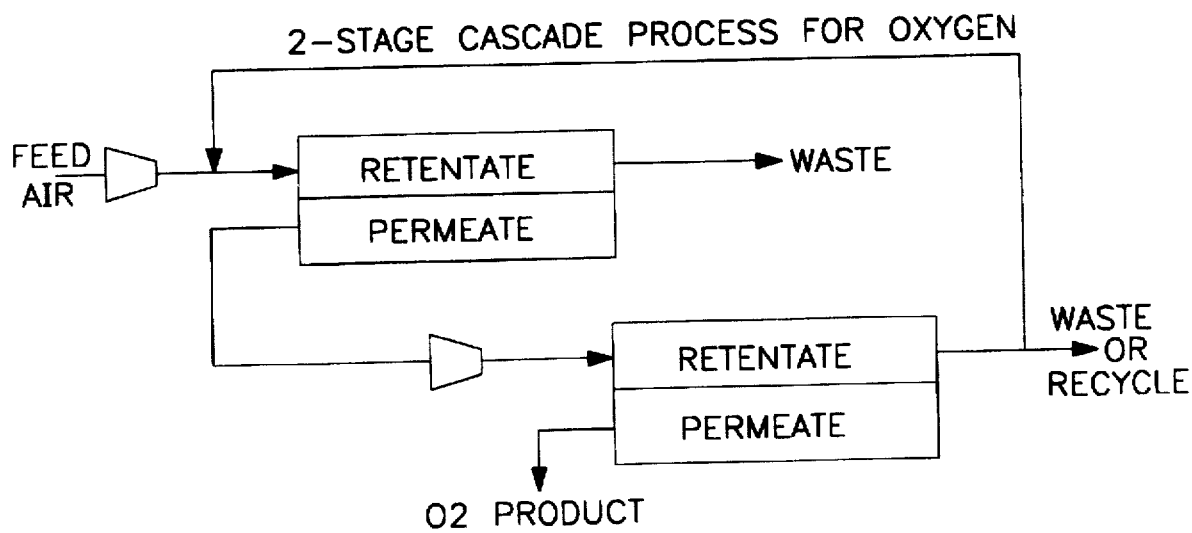
FIG. 1 illustrates a two stage cascade process for the purification of oxygen from oxygen-containing mixtures.

In the figures, the retentate side of all permeators is shown at the top while the permeate side is shown at the bottom. During operation, gases cross the gas separation membranes from the retentate side to the permeate side.

DETAILED DESCRIPTION OF THE INVENTION

The invention may be used in any gas separation. Many separation membranes are known in the art and may be selected for the various permeator stages in accordance with their known permeabilities for the particular gases being separated.

In preferred embodiments, the present invention is designed to produce, for example, oxygen from air in the purity range of 60 to 90+% in an efficient manner. In one embodiment, it mixes feed air with reflux of one permeator stage, followed by two additional stages of permeation to achieve high purity oxygen as a permeate product. The present invention also preferably recovers the power from the expanded nitrogen-rich waste stream to improve oxygen product separation cost. In accordance with the invention, the operating parameters of the process are preferably adjusted so that, at one or more positions where streams are blended, streams having the same, or nearly the same, composition are blended, thus eliminating mixing losses and further enhancing process efficiency. This may be achieved by adjustments in the separation membrane composition or relative surface areas, or by adjusting other parameters that alter relative amounts of component gases. For example, increasing the feed flow rate decreases the stage cut through the separation membrane resulting in higher purity on the permeate side. On the other hand, increasing the pressure on the retentate side while keeping the feed flow constant increases the stage cut and reduces purity on the permeate side. Another parameter relevant to avoiding mixing dilution is the position at which a recycled stream joins the upstream gaseous flow. That upstream gaseous flow will be more pure if it has already undergone a purification step that increases its purity, and especially if it has already undergone two purification steps each of which increases its purity. Another parameter which affects the purity of the effluent from each stage is the surface area of the separation membrane in that stage.

One three-stage process of the invention will produce a high purity oxygen product while requiring only two compressors. One system of the invention is shown, for example, in FIG. 2. As shown, the first permeator feed stream is derived from recompressed permeate stream from the second permeator and the recycled retentate stream from the third permeator.

The two streams that contribute to the first permeator feed can be made to assume, in preferred embodiments, substantially identical compositions which are rich in oxygen relative to air. This permits making a higher purity oxygen product without incurring mixing losses from blending of the two streams of different compositions.

One embodiment of the advanced membrane process of the present invention is comprised of at least three permeators. Each permeator preferably consists of one or more modules containing a bundle of hollow fibers, preferably wound in an ordered manner so that the fibers are effectively of equal length. The hollow fibers are asymmetric, or, preferably, composite elements that have a thin permselective membrane barrier on the bore side or the shell side of the porous hollow fiber substrate. Such hollow fiber elements are well known and widely used in gas separation processes.

When air is the gaseous mixture to be separated into component parts, known hollow fiber membranes may be chosen, for example, those that allow oxygen to permeate at a higher rate than nitrogen, as represented by the "separation factor" designated "Alpha" which is the permeability of oxygen relative to that of nitrogen. Separation factors of presently available membranes are typically between 3 and 10. When a high-pressure air stream is passed along the hollow-fiber bundle, oxygen preferentially permeates the membrane, thus making the "permeate" rich in oxygen and the "retentate" rich in nitrogen. The fraction of a stage's feed gas that is permeated is referred to as the stage cut. In general, lower stage cuts yield higher $O_2$ concentrations. Permeator modules can follow the "crossflow" or "countercurrent flow" models. In cross flow permeation, the local permeate stream flows perpendicular to and away from the feed stream on the opposite side of the membrane. In addition, the local permeate concentration is independent of the bulk permeate concentration which for instance could be in the bore of a hollow fiber membrane. In countercurrent permeation the feed and permeate stream flow in parallel but opposite direction to each other. Furthermore, the local permeate composition is identical to the bulk permeate composition.

Many membrane separation processes have been designed according to the crossflow model, wherein there is no beneficial effect of employing a separate low-pressure purge or reflux stream. Crossflow permeators are therefore typically 3-port devices with connections for the feed, retentate and permeate streams.

In order to benefit from countercurrent-flow advantages, one permeator may be a 4-port device that will accommodate a low-pressure purge or reflux stream. In one mode of practicing this invention illustrated in FIG. 2, the second permeator 2 of the system (and the first to receive the gaseous mixture to be purified) is of the 4-port variety. The other permeators can utilize either 3-port or 4-port modules. The 4-port modules, which can take advantage of countercurrent flow operation, can be purged but may be more difficult and costly to build.

Figure 2:
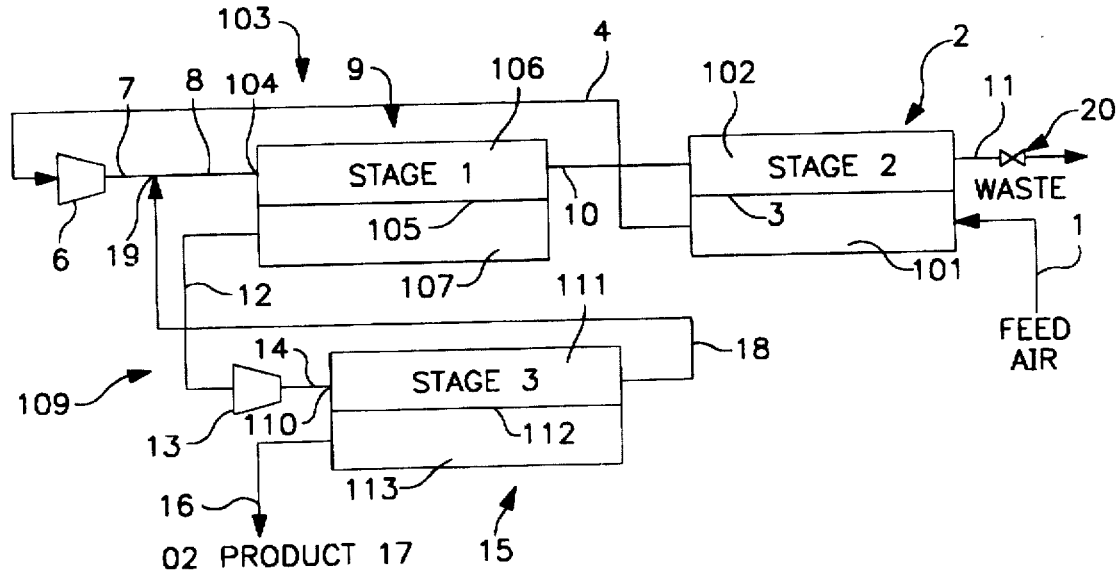
FIG. 2 illustrates an advanced three stage process of the invention.
Figure 3:
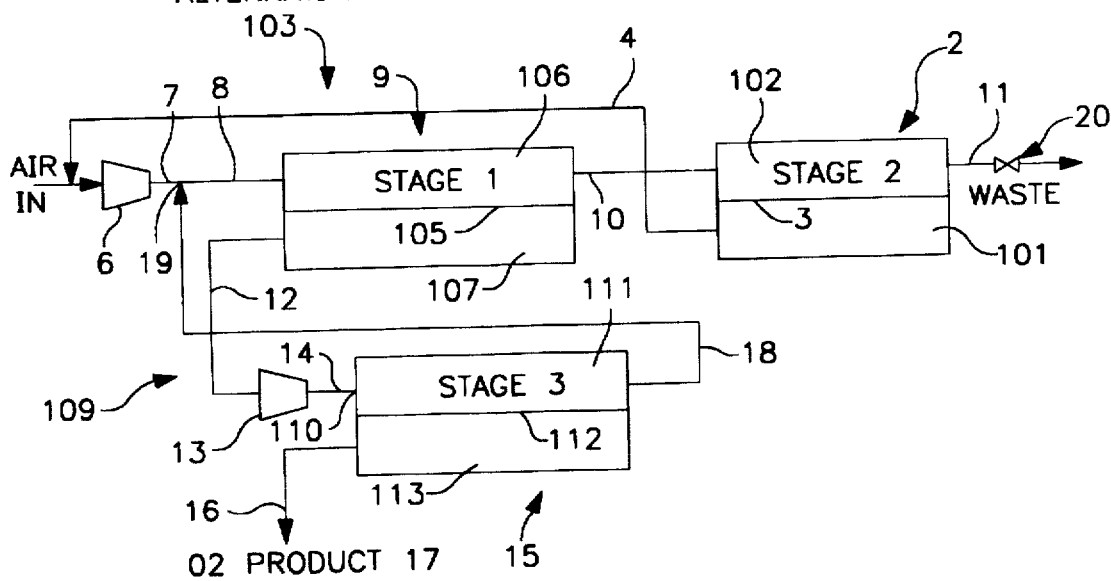
FIG. 3 illustrates an alternative three stage process of the invention with an alternative inlet position for receiving the gaseous mixture to be purified.

One advanced process of the present invention uses at least one 4-port permeator module which can be purged (see e.g., permeator 2 of FIG. 2). These modules can be fabricated easily by those of skill in the art. An alternative embodiment of the invention uses only three-port modules in a three stage process as shown in FIG. 3. In this process, feed air is combined with the recycled permeate from the second permeator, which is a 3-port device, to serve as the feed for the first permeator. The other elements in the process are the same as in FIG. 2.

In the embodiment of FIG. 2, feed air is admitted through line 1 as a low-pressure purge through the permeate side 101 of the 4-port permeator 2, wherein permeate side 101 is separated by membrane 3 from retentate side 102. This low pressure feed stream acquires additional oxygen that permeates membrane 3 from a high pressure stream flowing countercurrently through a conduit 10 into retentate side 102 of permeator 2. The oxygen-enriched air then passes through a first section 4 of conduit 103 to the inlet of a compressor 6. Compressor 6 may be located anywhere along conduit 103. In the alternative embodiment of FIG. 3, compressor 6 is preferably at a location where it also receives the incoming air. However, it may be elsewhere in conduit 103 if the incoming air is pressurized.

Compressed gas from compressor 6 passes through sections 7 and 8 of conduit 103 to the high pressure feed port 104 of first permeator 9. Like the second permeator 2, first permeator 9 is also divided by a membrane (membrane 105) into retentate side 106 and permeate side 107. Feed port 104 introduces compressed gas into retentate side 106. The permeate stream in permeator 9 is further enriched in oxygen permeating through membrane 105. The oxygen-depleted retentate is conducted at high pressure through conduit 10 to retentate side 102 of second permeator 2, where it supplies oxygen by permeation to the low-pressure air purge stream fed by line 1 to permeate side 101 of second permeator 2. The nitrogen-rich second permeator retentate emerges from second permeator 2 through conduit 11. It is still at high pressure and can be expanded to supply work.

An oxygen-rich permeate from first permeator 9 passes through section 12 of conduit 109 to the inlet of a second compressor 13. Second compressor 13 is optional and need not be present if the stage 1 permeate is at pressure. This would be the case, for example, if flow rate were low, the pressure provided by compressor 6 high, and the stage cut of the first permeator high. In that embodiment, compressor 6 should be downstream, instead of upstream, from point 19. The resulting compressed gas is conducted through section 14 of conduit 109 to high pressure feed port 110 which introduces the feed to retentate side 111 of third permeator 15. The permeate which crosses membrane 112 into permeate side 113 of permeator 15 becomes further enriched in oxygen, and is taken through conduit 16 as the oxygen product 17. The retentate from the third permeator 15 is taken through conduit 18 and reinjected into the high-pressure feed of the first permeator 9 by means of a "T" connection 19 of conduit 18 into and between sections 7 and 8 of conduit 103. This feed stream to first permeator 9 is thus a blend of two streams, the recompressed permeate from second permeator 2 and the retentate from third permeator 15.

By appropriate allocation of the membrane areas of membranes 3, 105 and 112 among the three permeators 2, 9 and 15, the selection of suitable operating pressure (preferably controlled by the compressors) and by controlling the overall process "stage-cut", by throttling the waste stream through a valve 20, for example, these two streams, the permeate exiting from permeator two and the retentate from permeator three, can be made to approach the same composition, thus avoiding the mixing losses that are inherent in the usual recycled cascade process. Valve 20 or similar flow control means is among the simpler ways of controlling purity, i.e. by controlling flow rate. In the alternative embodiment of FIG. 3, the retentate of stage 3 would ideally have the same composition as the combined stream formed from the permeate of stage 2 and feed air. To be economically advantageous, the recycled gaseous mixture in conduit 103 should preferably be at least five percent, and more preferably at least eight percent, more pure in the desired component gas than is the original unpurified mixture that is introduced into the system.

The design of the advanced three stage process depends on the range of purities required for the oxygen product 17. The less membrane area allocated to first permeation membrane 105, relative to the membrane area allocated to second permeation membrane 3, the higher the maximum purity of product. In preferred embodiments, ratios of first membrane area to second membrane area may be less than 5:5, preferably less than 3:7 and more preferably less than 1:9. However, higher ratios (e.g., 7:3) also provide good results. (See FIG. 5). The low surface area in stage 1 contributes to enhanced purity on the permeate side of stage 1. The larger surface area of stage 2, in the preferred embodiment, best utilizes the energy of the high pressure on the retentate side. Once the ratio of surface areas in the first and second permeators is determined, the membrane area for membrane 112 of third permeator 15, can be chosen so as to make the composition of the recycled retentate stream in conduit 18 similar to the composition of the gas flowing in section 7 of conduit 103, thus reducing any mixing losses at the junction point, "T" connection 19. It is possible to operate the third stage at lower stage cuts by reducing its area. This would produce an increase in product $O_2$ concentration but would result in the retentate from stage 3 being at a different composition from the gas in section 7 of conduit 103. This would cause increased mixing losses. The size of the second compressor 13 is also determined by the maximum product oxygen purity flow rate and pressure of operation. Another degree of freedom is the overall stage cut. This can be controlled by throttling the waste flow, as with valve 20, or by otherwise controlling the flow through compressor 6. Product purities less than the maximum purity can be adjusted over a range by altering the stage cut. For fixed membrane areas in the 3 stages and a prescribed operating pressure, both the product flow rate and the product oxygen purity decreases as the stage cut is increased, beyond the maximum purity.

The present invention provides an apparatus having multiple permeator stages and a lesser number of compressors than permeators, thus allowing significant cost savings. Substantial savings is also achieved by minimizing gas mixing losses. Such mixing losses are reduced by, inter alia, reducing the difference in purity of the two gaseous streams that intermix, for example, at point 19 of FIG. 2. This is more easily accomplished with the embodiment of FIG. 2, but FIG. 3 is sometimes a more cost effective configuration, because it requires 3-port permeators only.

EXAMPLES

Computer simulations have been made to compare the capabilities of a process of the invention of FIG. 2 with prior art processes (the two stage feed refluxed process and the normal two stage recycle process). For all computations, the permeation module of all the permeators were assumed to follow the "countercurrent" model.

The simulation program was designed to compute the concentration of oxygen in the product stream as a function of the overall stage cut, for fixed values of membrane permeability and separation factor, and for fixed values of the high and low pressures. Various values were assumed for the ratio of the membrane area of the first permeator to that of the second permeator. The third permeator area is determined by the stipulation that the gas streams blended at point 19 of the feed to the first permeator be of the same composition. The overall stage cut is used as an independent variable in these computations.

In addition to determining the product oxygen concentration as a function of the stage cut, the program also determined the "area factor" and the "compressor factor" for each operating point. The "area factor" is the total membrane area required to produce a unit flux of "equivalent pure" oxygen in the product stream. The "equivalent pure" oxygen is the amount of pure oxygen that would be required to produce the product when blended with "free" air. This method of expression permits different separation processes to be compared equitably.

The "compressor factor" is the total quantity of gas that must be compressed for unit "equivalent pure" flux of oxygen. The power required is determined by the compressor factor and the pressure of operation. The overall cost of the process depends on the combination of the area and compressor factors. In many cases, however, the cost is dominated by power costs of compression.

Figure 4:
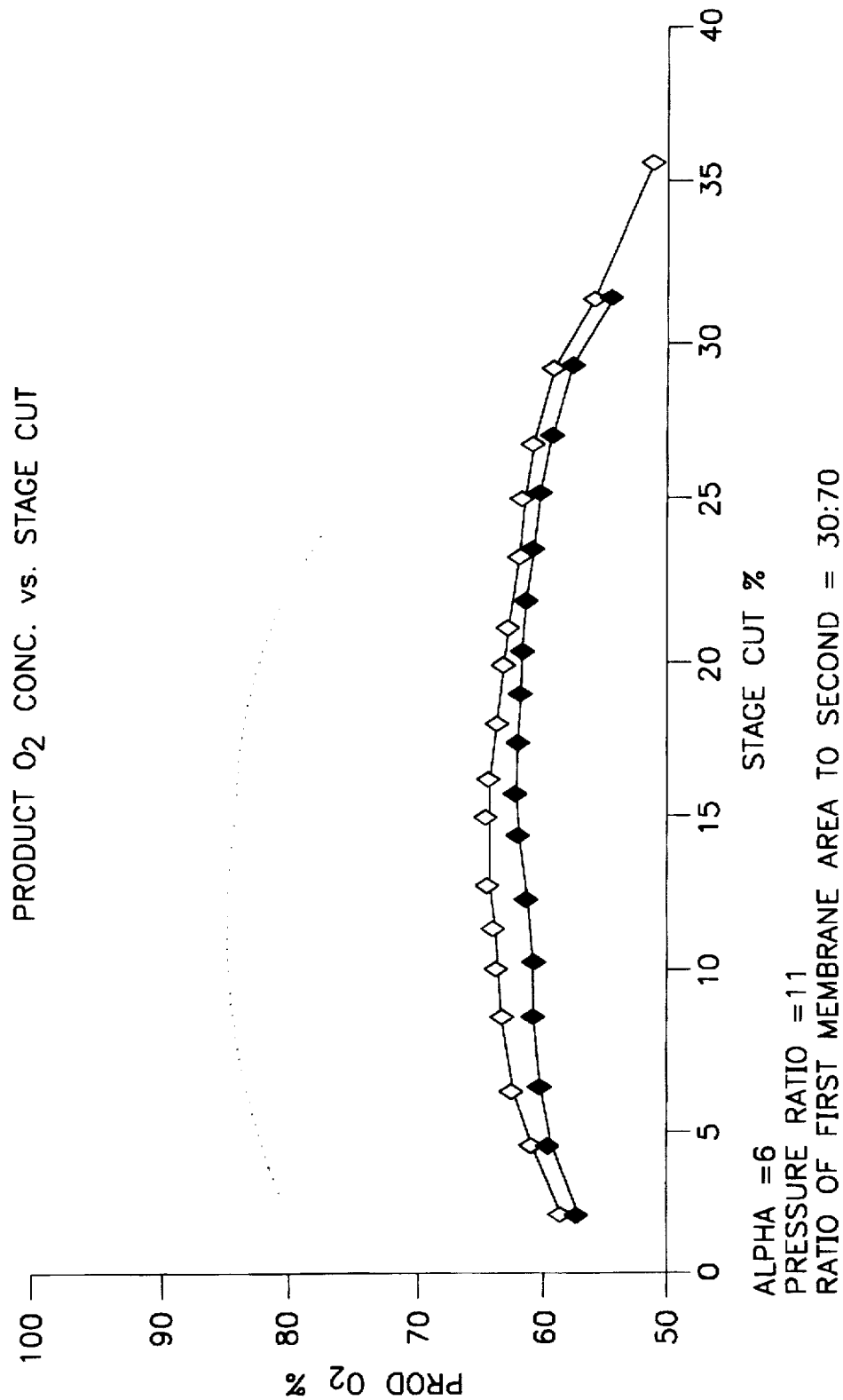
FIG. 4 is a graph of purity levels versus stage cut, showing superior purification achievable by the invention versus prior art separation systems.
Figure 5:
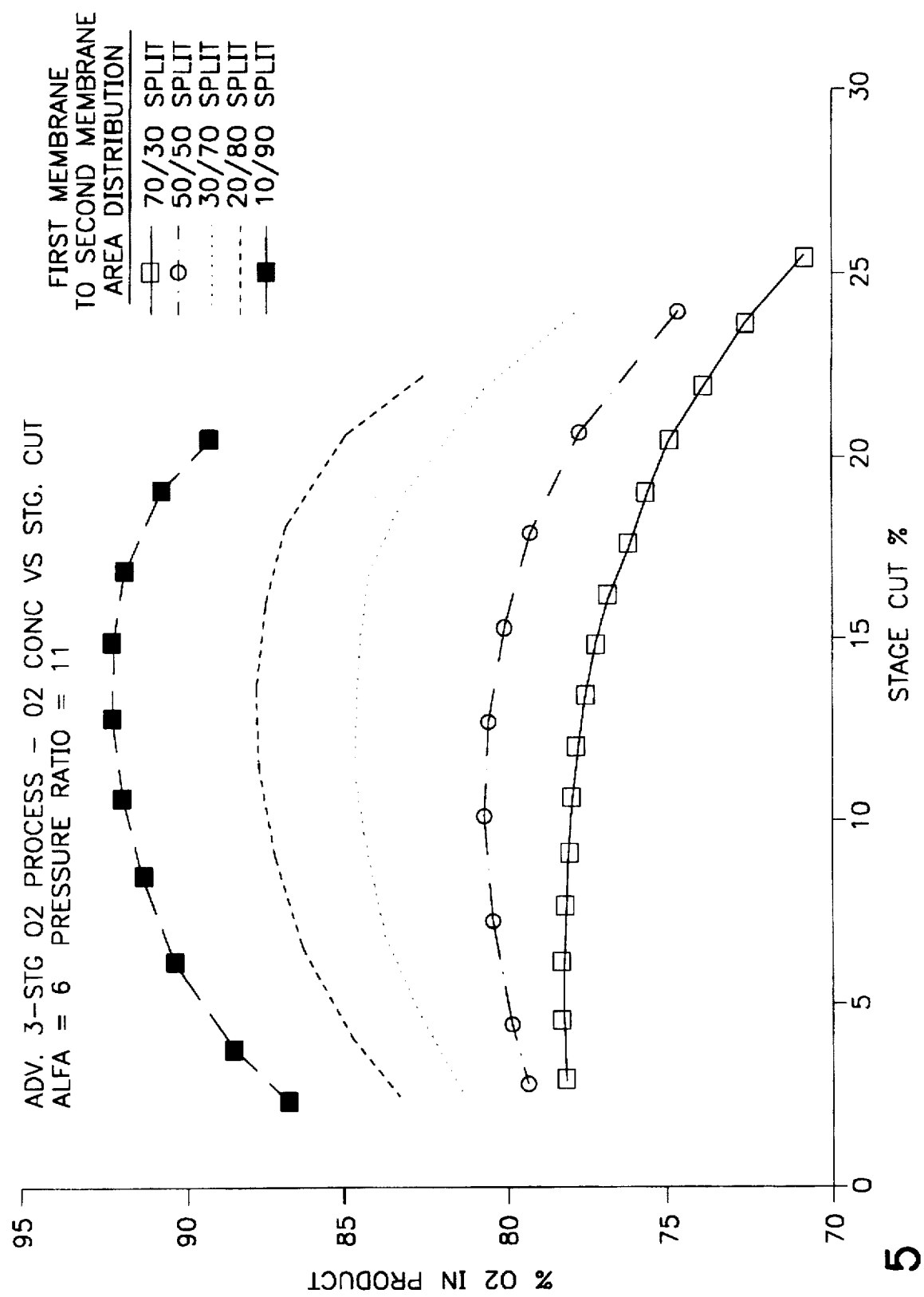
FIG. 5 graphically illustrates the advanced effectiveness of the three stage oxygen process by showing oxygen purity achieved as a function of stage cut at different area ratios.

The results of the simulations are depicted graphically in FIGS. 4 and 5. All of the computations have been made assuming a membrane separation factor of 6 and a pressure ratio of 11. FIG. 4 shows the superior product purity obtainable by the invention relative to a prior art two stage recycle process and the feed-refluxed process, respectively. In FIG. 4, the product oxygen purity is plotted against the stage cut at a constant 30:70 split of first permeator membrane area to second permeator membrane area.

It is apparent from this Figure, that the purity obtainable in accordance with the invention is shown to be significantly higher than both prior art processes. Higher oxygen purities are attainable as more of the total area is allocated to the second permeator stage. For a Stage one Stage two area ratio of 30:70, FIG. 4 shows that a maximum oxygen concentration of 65% can be produced by the feed-refluxed process at a stage cut of about 16%, which is significantly below the purity obtainable in accordance with the invention (percentage in the mid-80's)

FIG. 5 shows the high purities (versus stage cut) obtainable in accordance with the invention when the membrane area distribution is varied. Purities above 90% are shown to be obtainable with a 10:90 split. Even with a far less favorable 70:30 split, higher purities result than the prior art achieves even at a more favorable 30:70 split (compare FIG. 4).

Similar comparative studies between the invention and prior art systems also show that, for a given product purity (and holding other parameters constant), the systems of the invention provide high purities at more desirable compression factors and area factors.

The overall cost of the process will be determined by a combination of the area and compressor factors. The principal advantage of the advanced three-stage process is that it permits making a high purity oxygen product. Product purities greater than 90% can be efficiently produced. These purities cannot be as economically achieved by the prior art processes. Lower oxygen purities can be produced efficiently in the advanced process by employing lower area ratios. Only at considerably lower purities will the two stage processes of the prior art become competitive with the advanced process of the present invention, and only at very low purities, may the simple single-stage process be economically competitive. For instance for a selectivity of 6, the two stage process may be advantageous only for purities below about 60% and the single stage process for purities below about 45%. The actual purities of crossover depends on the membrane properties, process condition and the economic function used.

Pertinent process parameters expected to produce about 92% $O_2$ from air are shown as follows:

Feed Air Pressure 1 atm
Stage 1 Compressor Discharge 11 atm
Ambient Air $O_2$ Concentration 20.9%
Product Pressure (Stg. 3 Permeate) 1 atm
Product $O_2$ Concentration 92%
Waste $O_2$ Concentration 8%
Overall Stage Cut 15.3%
Stage 3 Compressor Discharge 11 atm
Area Ratio Stage 1:Stage 2 1:9
Stage 2 Feed $O_2$ Concentration 42.6%
Stage 2 Permeate $O_2$ Concentration 45.59
Stage 3 Retentate $O_2$ Concentration 45.59
Membrane Selectivity, $O_2/N_2$ 6
Membrane Permeability 1 ncf/ft$^2$-psi-day Area in stage 3 is adjusted so that stage 2 permeate $O_2$ concentration and stage 3 retentate $O_2$ concentration are equal. The Stage 1 compressor factor (Stage 2 Permeate Flow/Product Flow) is 16.8. The Stage 3 compressor factor (Stage 1 Permeate Flow/Product Flow) is 1.5.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method for separating a gaseous mixture into a purified component gas thereof, said method comprising:
    (a) providing a separation apparatus containing the following components:
        (1) a first permeator containing a first gas separation membrane that divides said first permeator into a first permeate side and a first retentate side,
        (2) a second permeator containing a second gas separation membrane that divides said second permeator into a second permeate side and a second retentate side,
        (3) a third permeator containing a third gas separation membrane that divides said third permeator into a third permeate side and a third retentate side,
        (4) a first conduit connecting an effluent end of said second permeate side to an influx end of said first retentate side for conducting a gaseous stream from said second permeator to said first permeator,
        (5) a second conduit connecting an effluent end of said first retentate side to an influx end of said second retentate side for conducting a gaseous stream from said first permeator to said second permeator, (6) a third conduit connecting an effluent end of said first permeate side to an influx end of said third retentate side for conducting a gaseous stream from said first permeator to said third permeator, and (7) a fourth conduit connecting an effluent end of said third retentate side to said first conduit or an influx end of said first retentate side, for conducting a recyclable gaseous effluent from said third retentate side to said first conduit or said influx end of said first retentate side and for intermixing said recyclable effluent into a gaseous stream flowing through said first conduit or said influx end of said first retentate side, (8) an inlet for receiving said feed mixture into a position selected from the group consisting of the first conduit, the second permeate side, and the first retentate side, and (9) a compressor upstream of said first retentate side;

(b) introducing a feed mixture of gases to be purified into said separation apparatus; and (c) recovering said purified component gas as permeate from said third permeator.

2. The method of claim 1, further comprising reducing gas purity differences between said recyclable effluent and the gaseous stream in said first conduit.

3. The method of claim 1, further comprising reducing gas purity differences between said gaseous mixture permeating said second separation membrane at the influx end of said second permeate side of said second permeator and a countercurrent feed stream entering said second permeator side at said influx end.

4. The method of claim 1, wherein the percentage of component gas that is in said recyclable effluent differs from the percentage of component gas in said gaseous stream of said first conduit, at a point of intermixing, by no more than 10%.

5. The method of claim 4, wherein the percentage of said component gas that is in said recyclable effluent differs from the percentage of said component gas in said gaseous stream of said first conduit, at a point of intermixing, by no more than 5%.

6. The method of claim 4, wherein the percentage of said component gas that is in said recyclable effluent differs from the percentage of said component gas in said gaseous stream of said first conduit, at a point of intermixing, by no more than 2%.

7. The method of claim 1 wherein a percentage of component gas in a gaseous mixture permeating said second separation membrane at the influx end of said second permeate side of said second permeator differs from a percentage of component gas in a countercurrent feed stream of said feed mixture entering said second permeate side at said influx end, by less than 10%.

8. The method of claim 1 wherein a percentage of said component gas in a gaseous mixture permeating said second separation membrane at the influx end of said second permeate side of said second permeator differs from a percentage of said component gas in a countercurrent feed stream of said feed mixture entering said second permeate side at said influx end, by less than 5%.

9. The method of claim 1 wherein a percentage of said component gas in a gaseous mixture permeating said second separation membrane at the influx end of said second permeate side of said second permeator differs from a percentage of said component gas in a countercurrent feed stream of said feed mixture entering said second permeate side at said influx end, by less than 2%.

10. The method of claim 1 wherein the feed mixture comprises oxygen and nitrogen.

11. An apparatus for separating a gaseous mixture so as to produce a purified component gas thereof comprising:

(a) a first permeator containing a first gas separation membrane that divides said first permeator into a first permeate side and a first retentate side, (b) a second permeator containing a second gas separation membrane that divides said second permeator into a second permeate side and a second retentate side, (c) a third permeator containing a third gas separation membrane that divides said third permeator into a third permeate side and a third retentate side, (d) a first conduit connecting an effluent end of said second permeate side to an influx end of said first retentate side for conducting a gaseous stream from said second permeator to said first permeator, (e) a second conduit connecting an effluent end of said first retentate side to an influx end of said second retentate side for conducting a gaseous stream from said first permeator to said second permeator, (f) a third conduit connecting an effluent end of said first permeate side to an influx end of said third retentate side for conducting a gaseous stream from said first permeator to said third permeator, (g) a fourth conduit connecting an effluent end of said third retentate side to said first conduit or to said first retentate side, for conducting a recyclable gaseous stream from said third retentate side to said first conduit or to said first retentate side and for intermixing said recyclable stream into a gaseous stream flowing through said first conduit or through said first retentate side, (h) an inlet for receiving a gaseous mixture into the apparatus at a position selected from the group consisting of the first conduit, the second permeate side, and the first retentate side, (i) an outlet on said third permeate side for recovering purified component gas, and (j) a compressor upstream of said first retentate side.

12. The apparatus of claim 11 wherein said third conduit includes a compressor capable of raising the pressure of gases delivered to said third retentate side relative to a pressure of gases exiting said first permeate side.

13. The apparatus of claim 11 wherein said fourth conduit joins said first conduit at a T connection between said compressor and said first permeator.

14. The apparatus of claim 11 wherein the third permeate side of said third permeator includes an outlet conduit for removing said purified component gas from said apparatus.

15. The apparatus of claim 11 wherein a membrane area of the first permeator is no more than a membrane area of said second permeator.

16. The apparatus of claim 11 wherein a ratio of a membrane area of said first permeator to a membrane area of said second permeator is no more than 3:7.

17. The apparatus of claim 11 wherein a ratio of a membrane area of said first permeator to a membrane area of said second permeator is no more than 1:9.

18. The apparatus of claim 11 further comprising:

a second compressor within said third conduit capable of raising the pressure of gases entering said third retentate side relative to gases exiting said first permeate side.

19. The apparatus of claim 11 further comprising a fifth conduit for conducting a gaseous stream from an effluent end of said second retentate side out of said apparatus, wherein said fifth conduit includes an adjustable flow control means.

20. The apparatus of claim 11, wherein said inlet for receiving said gaseous mixture into the apparatus is at the second permeate side.

21. The apparatus of claim 11, wherein said inlet for receiving said gaseous mixture into the apparatus is on the first conduit.

* * * * *